(12) United States Patent
Wang et al.

(10) Patent No.: US 11,162,820 B2
(45) Date of Patent: Nov. 2, 2021

(54) OPTICAL REFLECTIVE COMPONENT AND OPTICAL ENCODER USING SAME

(71) Applicant: Delta Electronics, Inc., Taoyuan (TW)

(72) Inventors: Horng-Jou Wang, Taoyuan (TW); Tsung-En Chan, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/890,842

(22) Filed: Jun. 2, 2020

(65) Prior Publication Data
US 2021/0063207 A1 Mar. 4, 2021

(30) Foreign Application Priority Data
Sep. 4, 2019 (CN) .......................... 201910831191.9

(51) Int. Cl.
| | |
|---|---|
| *G01D 5/34* | (2006.01) |
| *G01D 5/347* | (2006.01) |
| *G02B 7/182* | (2021.01) |
| *G02B 5/08* | (2006.01) |

(52) U.S. Cl.
CPC ....... *G01D 5/3473* (2013.01); *G01D 5/34707* (2013.01); *G02B 5/08* (2013.01); *G02B 7/1821* (2013.01)

(58) Field of Classification Search
CPC .. G01D 5/347; G01D 5/3473; G01D 5/34707; G01D 5/34738; G02B 7/1821
See application file for complete search history.

(56) References Cited

U.S. PATENT DOCUMENTS

| | | |
|---|---|---|
| 4,982,084 A | 1/1991 | Ushiyama et al. |
| 5,070,238 A | 12/1991 | Ishihara et al. |
| 5,073,710 A | 12/1991 | Takagi et al. |
| 6,232,593 B1 | 5/2001 | Taniguchi et al. |
| 8,264,380 B2 | 9/2012 | Hasegawa |
| 9,797,754 B2 | 10/2017 | Thales |

(Continued)

FOREIGN PATENT DOCUMENTS

| | | |
|---|---|---|
| CN | 1198989 C | 4/2005 |
| CN | 1992479 B | 5/2010 |
| CN | 201680850 U | 12/2010 |

(Continued)

*Primary Examiner* — Kevin K Pyo
(74) *Attorney, Agent, or Firm* — Kirton McConkie; Evan R. Witt

(57) ABSTRACT

An optical reflective component and an optical encoder using the same are disclosed. The optical reflective component includes a main body, an optical pattern, a first attaching portion and a second attaching portion. The main body has a first central axis and a reflective surface perpendicular to each other. The optical pattern is disposed on the reflective surface and centered at the central axis. The first attaching portion is centered at the first central axis of the main body and extends from the man body in a direction parallel to the first central axis. The first attaching portion has an inner wall. The second attaching portion has a plane perpendicular to the first central axis. The plane is connected to the inner wall. The main body, the first attaching portion and the second attaching portion are formed of a metal material and are integrally formed with the optical pattern.

20 Claims, 16 Drawing Sheets

(56) References Cited

U.S. PATENT DOCUMENTS

2010/0193671 A1  8/2010  Oshida et al.
2015/0160041 A1* 6/2015  Hikichi .............. G01D 5/34707
                                          324/207.25

FOREIGN PATENT DOCUMENTS

| CN | 103080700 A | 5/2013 |
| CN | 103210283 A | 7/2013 |
| CN | 203550973 U | 4/2014 |
| CN | 108332116 A | 7/2018 |
| JP | 2004151076 A | 5/2004 |
| JP | 2008002970 A | 1/2008 |
| JP | 2009121958 A | 6/2009 |
| JP | 2011252783 A | 12/2011 |
| JP | 2016183983 A | 10/2016 |
| JP | 2018520339 A | 7/2018 |
| TW | 200702636 A | 1/2007 |
| TW | I457542 B | 10/2014 |

* cited by examiner

OPTICAL REFLECTIVE COMPONENT AND OPTICAL ENCODER USING SAME

FIELD OF THE INVENTION

The present disclosure relates to an optical reflective component, and more particularly to an integrated optical reflective component and an optical encoder using the same.

BACKGROUND OF THE INVENTION

A reflective optical encoder is an electro-mechanical device that converts the angular position or the motion of a shaft or axle to analog or digital output signals. The optical encoders are used in a wide range of applications that require monitoring or control, or both of mechanical systems.

The reflective optical encoder utilizes an optical reading module including a light source and a photo detector to measure changes in the position of an encoding strip on an optical reflective component. The light source and photodetector are located on the same side of the encoding strip, and the encoding strip consists of alternating reflective and absorbing stripes. The light source is positioned such that light from the light source is imaged into the detector when the light is reflected from the reflective stripes.

In a conventional optical reflective component, the encoding stripes are formed by several complicated steps of, for example coating a photoresist, exposure, development, etching and removing the photoresist. Moreover, the encoding stripes are formed on a glass, which is configured to fix on a rotating shaft of a motor through an additional component. However, the glass having the encoding stripes is too fragile to fix on the rotating shaft through the additional component. Furthermore, the manufacturing process of the conventional optical reflective component is too complicated to improve production efficiency.

Therefore, there is a need of providing an integrated optical reflective component and an optical encoder using the same to overcome the above drawbacks.

SUMMARY OF THE INVENTION

An object of the present disclosure is to provide an optical reflective component and an optical encoder using the same. The locking and fastening method of the optical reflective component and the rotating shaft of the optical encoder can be adjusted according to the practical requirements. The rotating shaft further includes a hollow portion for a leading wire passing therethrough. The positioning of the radius (r)-tangential (t) plane and the positioning of the axial (z) plane are achieved by assembling the optical reflective component with the rotating shaft of the optical encoder. It facilitates the first central axis of the optical reflective component and the second central axis of the rotating shaft to be coaxial. Thus, the optical reading module can read the optical pattern perpendicular to the first central axis accurately.

Another object of the present disclosure is to provide an optical reflective component and an optical encoder using the same. The optical reflective component is made of a metal material and integrally formed in one piece. Moreover, the optical pattern on the optical reflective component is formed, for example, by laser scribing. With the optical reflective component integrally formed, for example, an automated optical inspection (AOI) can be used to obtain the reference circle portion of the optical reflective component and define the position of the first central axis. Thus, the optical pattern can be scribed on the optical reflective component and coaxial with the first central axis of the optical reflective component accurately.

A further object of the present disclosure is to provide an optical reflective component and an optical encoder using the same. The optical pattern of the optical reflective component includes a plurality of even-width stripes, which are disposed on the reflective surface perpendicular to the first central axis and concavely formed by, for example, laser scribing. The plurality of even-width stripes are arranged in a circumferential direction to form a concentric annular distribution, which is circularly symmetrical. The reflective surface can be a mirrored surface, a polished surface or a milling-machined surface. The optical pattern scribed by the laser is characterized by optical low reflectivity, scattered reflection or diffuse reflection. In addition, the even-width stripe formed by laser-scribing is beneficial of maintaining the consistency of the optical pattern and reducing the processing time.

In accordance with an aspect of the present disclosure, an optical reflective component is provided. The optical reflective component includes a main body, an optical pattern, a first attaching portion and a second attaching portion. The main body includes a first central axis and a reflective surface. The first central axis and the reflective surface are perpendicular to each other. The optical pattern is disposed on the reflective surface. The optical pattern is arranged around and centered at the first central axis. The first attaching portion is centered at the first central axis of the main body and extends from the main body in a direction parallel to the first central axis. The first attaching portion includes at least one curved surface. The second attaching portion includes a plane. The plane is perpendicular to the first central axis of the main body and connected to the at least one curved surface of the first attaching portion. The main body, the first attaching portion and the second attaching portion are made of a metal material and integrally formed with the optical pattern.

In an embodiment, the first attaching portion is configured to connect with an outer edge of a rotating shaft, wherein the first central axis of the main body is aligned to a second central axis of the rotating shaft, and the second attaching portion is configured to match and align to a datum plane of the rotating shaft.

In an embodiment, the optical pattern includes a plurality of even-width stripes and the plurality of even-width stripes are directed to the first central axis of the main body.

In an embodiment, the plurality of even-width stripes are formed by laser scribing.

In an embodiment, the plurality of even-width stripes are concavely formed on the reflective surface of the main body.

In an embodiment, the optical pattern is centered at the first central axis of the main body and circularly symmetrical.

In an embodiment, the optical reflective component further includes a fastening hole located through the main body and aligned with the first central axis of the main body. The rotating shaft includes a fastening element and the optical reflective component is fastened on the rotating shaft by the fastening element located through the fastening hole.

In an embodiment, the optical reflective component further includes a fastening hole located through the first attaching portion. The rotating shaft includes a fastening element and the optical reflective component is fastened on the rotating shaft by the fastening element located through the fastening hole.

In an embodiment, the reflective surface is one selected from the group consisting of a mirrored surface, a polished surface and a milling-machined surface.

In accordance with another aspect of the present disclosure, an optical encoder is provided. The optical encoder includes a rotating shaft, an optical reflective component and an optical reading module. The rotating shaft includes a second central axis, an outer edge and a datum plane, and the datum plane is perpendicular to the second central axis. The optical reflective component is configured to connect to the rotating shaft and includes a main body, an optical pattern, a first attaching portion and a second attaching portion. The main body includes a first central axis and a reflective surface. The first central axis and the reflective surface are perpendicular to each other. The optical pattern is disposed on the reflective surface. The optical pattern is arranged around and centered at the first central axis of the main body. The first attaching portion is centered at the first central axis of the main body and extends from the main body in a direction parallel to the first central axis of the main body. The first attaching portion includes at least one curved surface configured to connect with the outer edge of the rotating shaft, so that the first central axis of the main body is aligned to the second central axis of the rotating shaft. The second attaching portion includes a plane. The plane is perpendicular to the first central axis of the main body and connected to the at least one curved surface of the first attaching portion. The second attaching portion is configured to match and align to the datum plane of the rotating shaft. The main body, the first attaching portion and the second attaching portion are made of a metal material and integrally formed with the optical pattern. The optical reading module is spatially disposed and facing to the optical pattern on the reflective surface. When the rotating shaft drives the optical reflective component to rotate, the optical pattern is read by the optical reading module.

In an embodiment, the optical pattern includes a plurality of even-width stripes and the plurality of even-width stripes are directed to the first central axis of the main body.

In an embodiment, the plurality of even-width stripes are formed by laser scribing.

In an embodiment, the plurality of even-width stripes are concavely formed on the reflective surface of the main body.

In an embodiment, the optical pattern is centered at the first central axis of the main body and circularly symmetrical.

In an embodiment, the optical reflective component further includes a fastening hole located through the main body and aligned with the first central axis of the main body. The rotating shaft includes a fastening element and the optical reflective component is fastened on the rotating shaft by the fastening element located through the fastening hole.

In an embodiment, the optical reflective component further includes a fastening hole located through the first attaching portion. The rotating shaft includes a fastening element and the optical reflective component is fastened on the rotating shaft by the fastening element located through the fastening hole.

In an embodiment, the reflective surface is one selected from the group consisting of a mirrored surface, a polished surface and a milling-machined surface.

In an embodiment, the rotating shaft includes a hollow portion disposed along the second central axis of the rotating shaft.

In an embodiment, the optical reading module is mounted on a circuit board, and the circuit board includes an opening. The rotating shaft passes through the opening.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
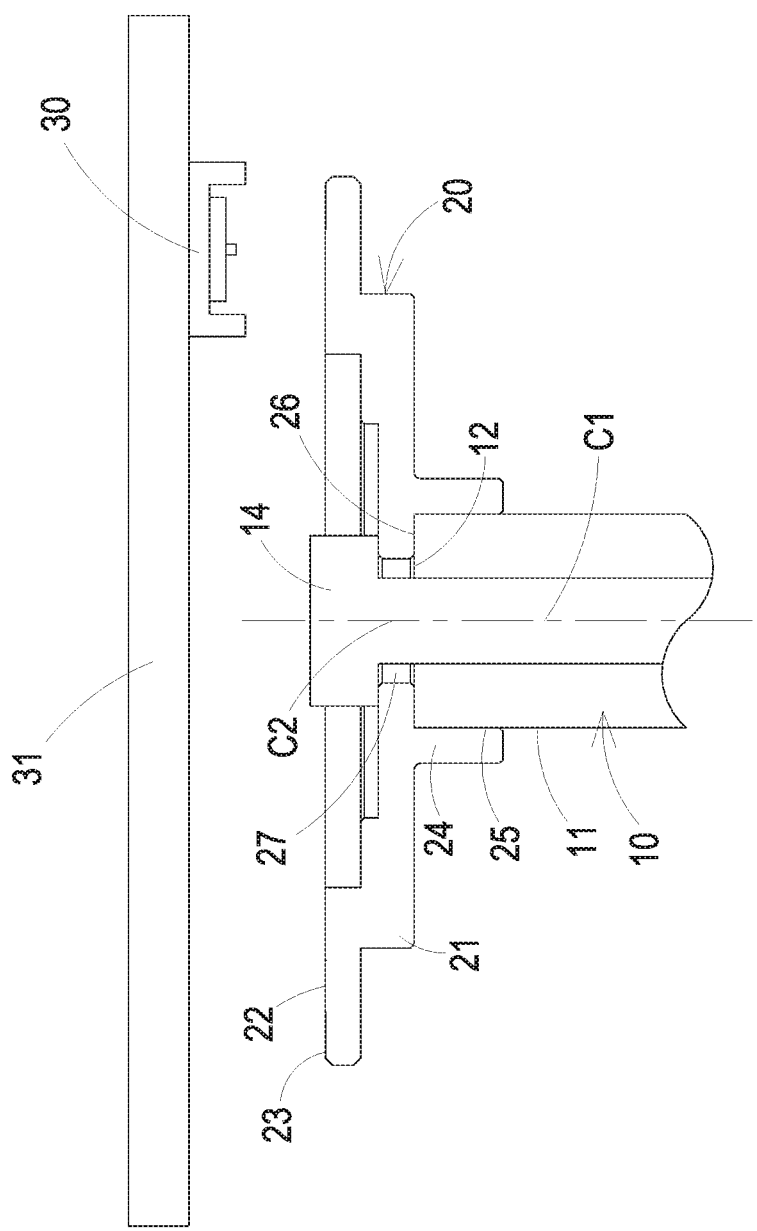
FIG. 1 is a cross-sectional view illustrating an optical encoder according to a first preferred embodiment of the present disclosure.
Figure 2:
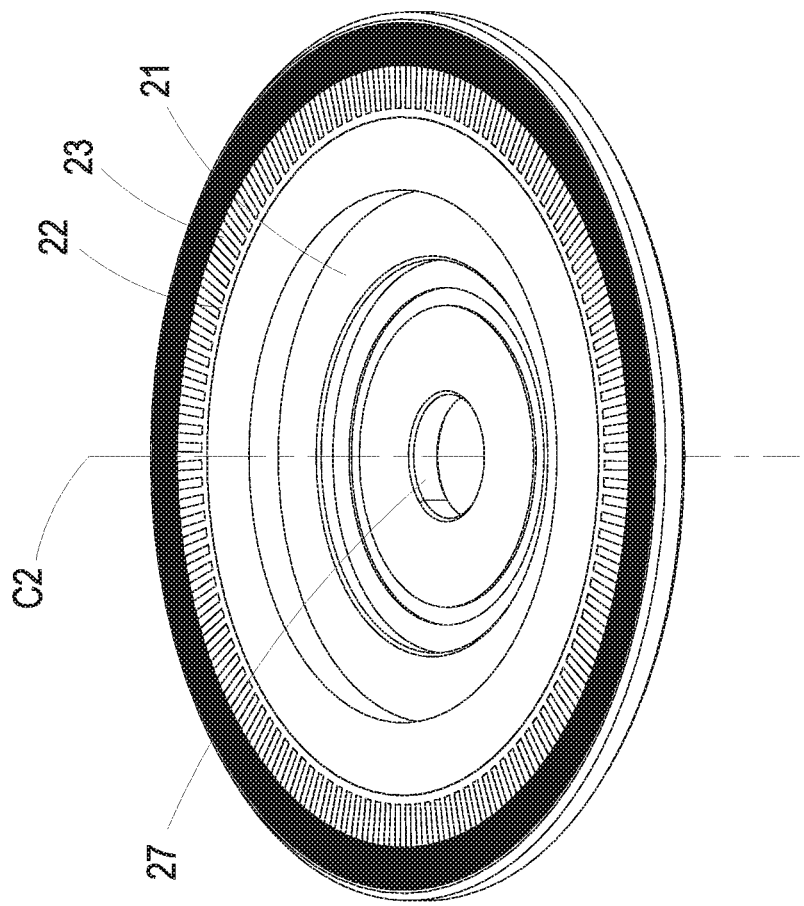
FIG. 2 is a perspective structural view illustrating an optical reflective component according to the first preferred embodiment of the present disclosure.
Figure 3:
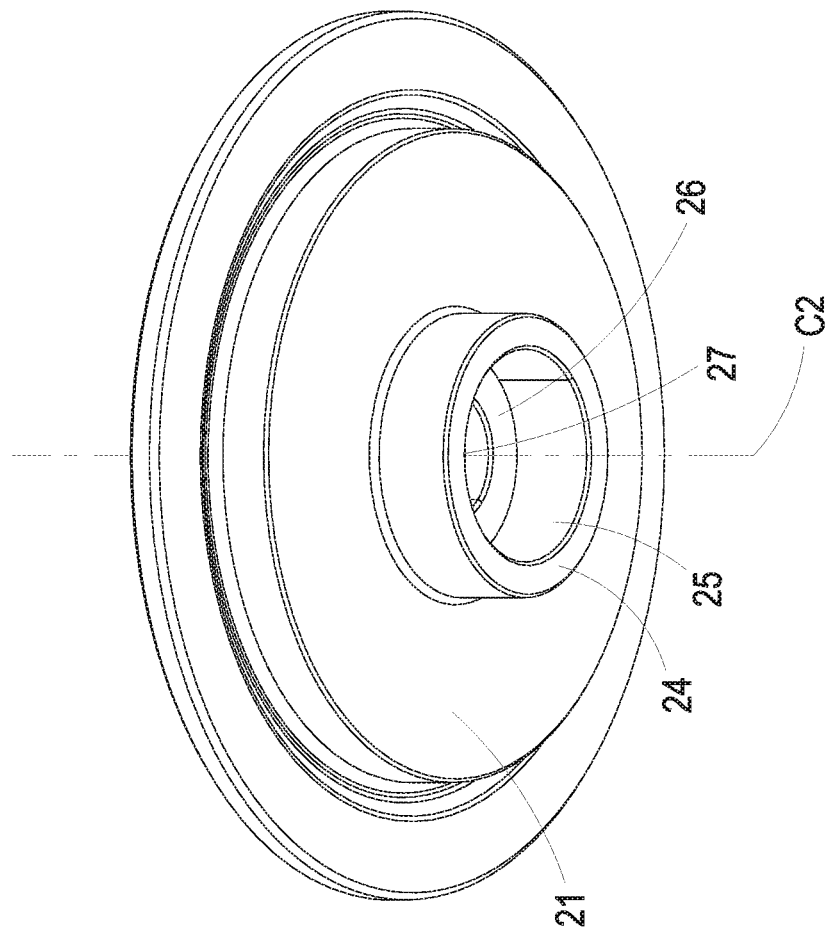
FIG. 3 is another perspective structural view illustrating the optical reflective component according to the first preferred embodiment of the present disclosure and taken at a different observation angle.
Figure 4:
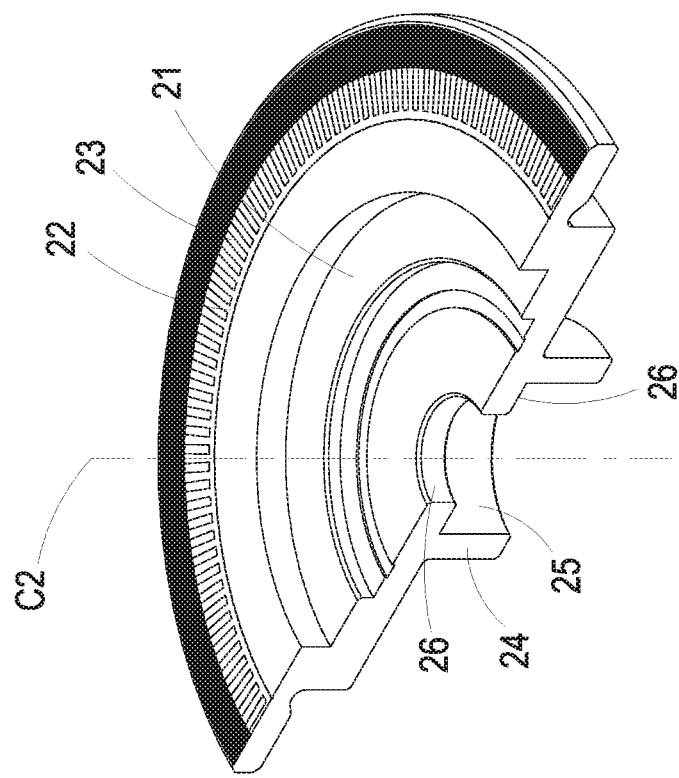
FIG. 4 is a sectional structure illustrating the optical reflective component according to the first preferred embodiment of the present disclosure.
Figure 5:
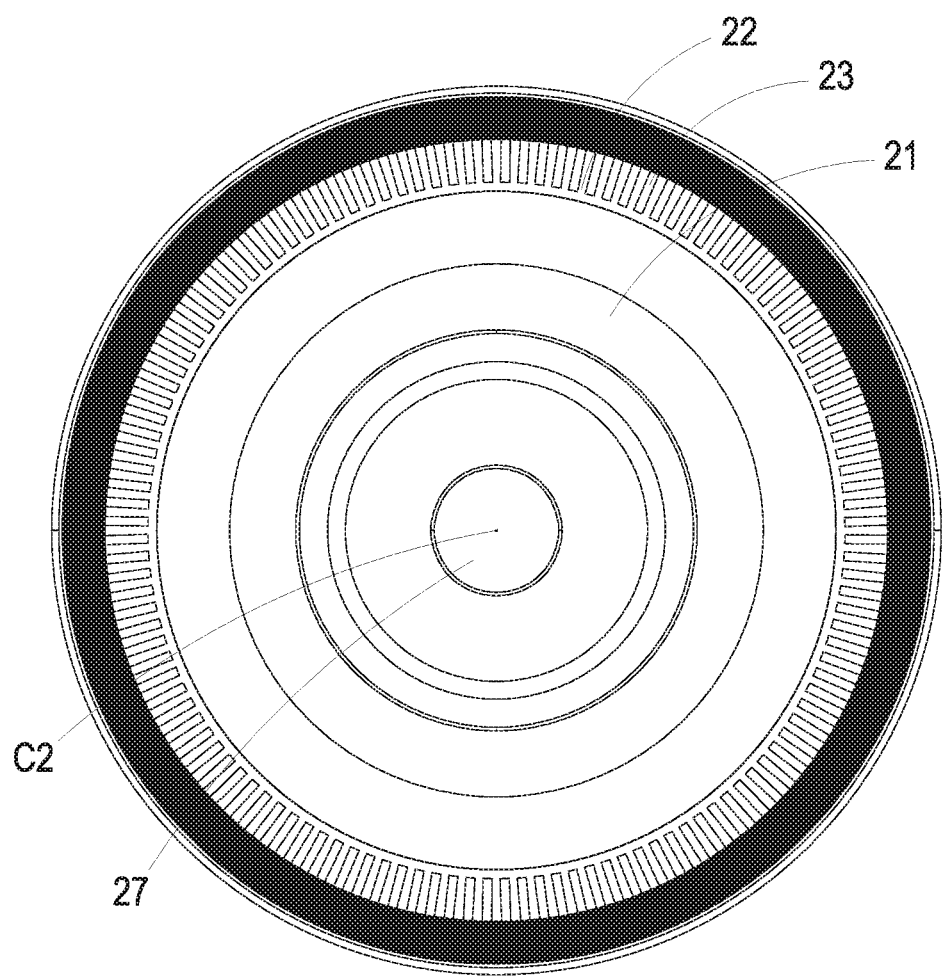
FIG. 5 is a top view illustrating the optical reflective component according to the first preferred embodiment of the present disclosure.

FIG. 1 is a cross-sectional view illustrating an optical encoder according to a first preferred embodiment of the present disclosure. FIG. 2 is a perspective structural view illustrating an optical reflective component according to the first preferred embodiment of the present disclosure. FIG. 3 is another perspective structural view illustrating the optical reflective component according to the first preferred embodiment of the present disclosure and taken at a different observation angle. FIG. 4 is a sectional structure illustrating the optical reflective component according to the first preferred embodiment of the present disclosure. FIG. 5 is a top view illustrating the optical reflective component according to the first preferred embodiment of the present disclosure. In the embodiment, the optical encoder 1 includes a rotating shaft 10, an optical reflective component 20 and an optical reading module 30. Preferably but not exclusively, the rotating shaft 10 is the rotating shaft of a motor or a drive module, and includes a first central axis C1, an outer edge 11 and a datum plane 12. The datum plane 12 is perpendicular to the first central axis C1. Preferably but not exclusively, the datum plane 12 is disposed on the top surface of the rotating shaft 10. In the embodiment, the optical reflective component 20 is configured to connect to the rotating shaft 10 and includes a main body 21, an optical pattern 23, a first attaching portion 24 and a second attaching portion 26. Preferably but not exclusively, the main body 21 is disk-shaped and includes a second central axis C2 and a reflective surface 22. The second central axis C2 and the reflective surface 22 are perpendicular to each other. In the embodiment, the optical pattern 23 includes for example a plurality of even-width stripes, disposed on the reflective surface 22 and located around the second central axis C2. Certainly, the present disclosure is not limited thereto. In another embodiment, the optical pattern 23 includes a plurality of uneven-width stripes. Preferably but not exclusively, the plurality of even-width stripes of the optical pattern 23 are formed by laser scribing, and the plurality of even-width stripes are concavely formed on the reflective surface 22 of the main body 21. Thus, the plurality of even-width stripes of the optical pattern 23 are centered at the second central axis C2 of the main body 21 and extended in a radial arrangement. Moreover, the plurality of even-width stripes of the optical pattern 23 are arranged along a circumferential direction to form a concentric annular distribution. Namely, the optical pattern 23 is circularly symmetrical. Since the optical pattern 23 is concavely formed on the reflective surface 22, the optical pattern 23 has the optical characteristics of low reflectance, scattered reflection or diffuse reflection, compared to the reflective surface 22. In the embodiment, the first attaching portion 24 is centered at the second central axis C2 of the main body 21 and extends for example from the main body 21 in a direction parallel to the second central axis C2 of the main body 21. The first attaching portion 24 includes at least one curved surface 25 disposed on an inner wall thereof and the at least one curved surface 25 is configured to connect with the outer edge 11 of the rotating shaft 10, so that the second central axis C2 of the main body 21 is aligned to the first central axis C1 of the rotating shaft 10. Preferably but not exclusively, the at least one curved surface 25 is an inner wall of a ring. In other embodiment, the inner wall of the first attaching portion 24 includes a ring surface or a conical surface. In the embodiment, the second attaching portion 26 includes a plane. The plane is perpendicular to the second central axis C2 of the main body 21 and connected to the at least one curved surface 25 of the first attaching portion 24. The second attaching portion 26 is configured to match and align to the datum plane 12 of the rotating shaft 10. In the embodiment, the main body 21, the first attaching portion 24 and the second attaching portion 26 are made of a metal material. Furthermore, the main body 21, the first attaching portion 24 and the second attaching portion 26 are integrally formed with the optical pattern 23.

Notably, the main body 21 and the first attaching portion 24 are produced, for example, by a machining process, so that the main body 21 and the first attaching portion 24 are coaxial precisely. In that, the center of the main body 21 and the center of the first attaching portion 24 are coaxial to form the second central axis C2 on the optical reflective component 20. By attaching the at least one curved surface 25 of the first attaching portion 24 onto the outer edge 11 of the rotating shaft 10, the optical reflective component 20 and the first central axis C1 of the rotating shaft 10 are coaxial. In that, the positioning of the radius (r)-tangential (t) plane is achieved. In addition, the plane of the second attaching portion 26 can be for example but not limited to a circular plane or an annular plane perpendicular to the second central axis C2. The plane of the second attaching portion 26 is located at another side opposite to the side with the reflective surface 22 and the optical pattern 23 disposed thereon. Alternatively, the plane of the second attaching portion 26 is located at the same side with the reflective surface 22 and the optical pattern 23 disposed thereon. The present disclosure is not limited thereto. By attaching the plane of the second attaching portion 26 to the datum plane 12 of the rotating shaft 10, the optical reflective component 20 and the rotating shaft 10 are assembled together and the positioning of the axial (z) plane is achieved. In the embodiment, the optical reflective component 20 further includes a fastening hole 27 located through the main body 21 and aligned with the second central axis C2 of the main body 21. The rotating shaft 10 includes a fastening element 14. The optical reflective component 20 is fastened on the rotating shaft 10 by the fastening element 14 located through the fastening hole 27. Thus, the rotating shaft 10 can drive the optical reflective component 20 to rotate around the first central axis C1. In the embodiment, the optical reading module 30 is spatially disposed and facing to the optical pattern 23 on the reflective surface 22. In an embodiment, the optical reading module 30 is mounted on a bottom of a circuit board 31 and faces to the optical pattern 23 on the reflective surface 22. When the rotating shaft 10 drives the optical reflective component 20 to rotate, the optical pattern 23 is read by the optical reading module 30.

Figure 6:
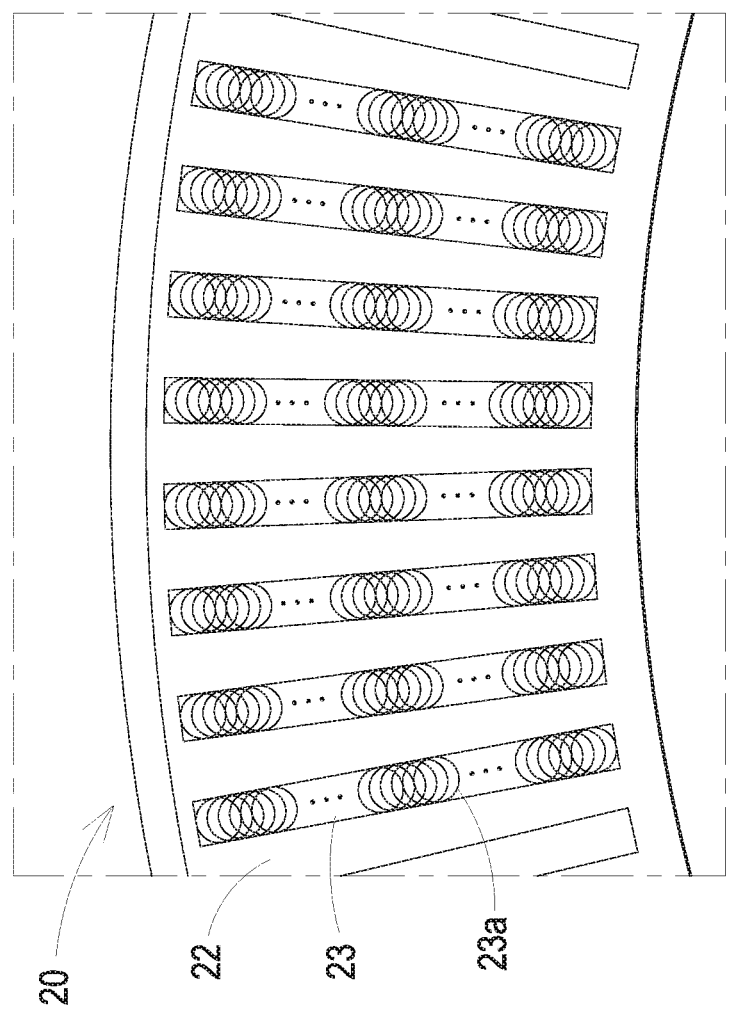
FIG. 6 is an exemplary structure illustrating the optical pattern of the optical reflective component according to the first preferred embodiment of the present disclosure.
Figure 7:
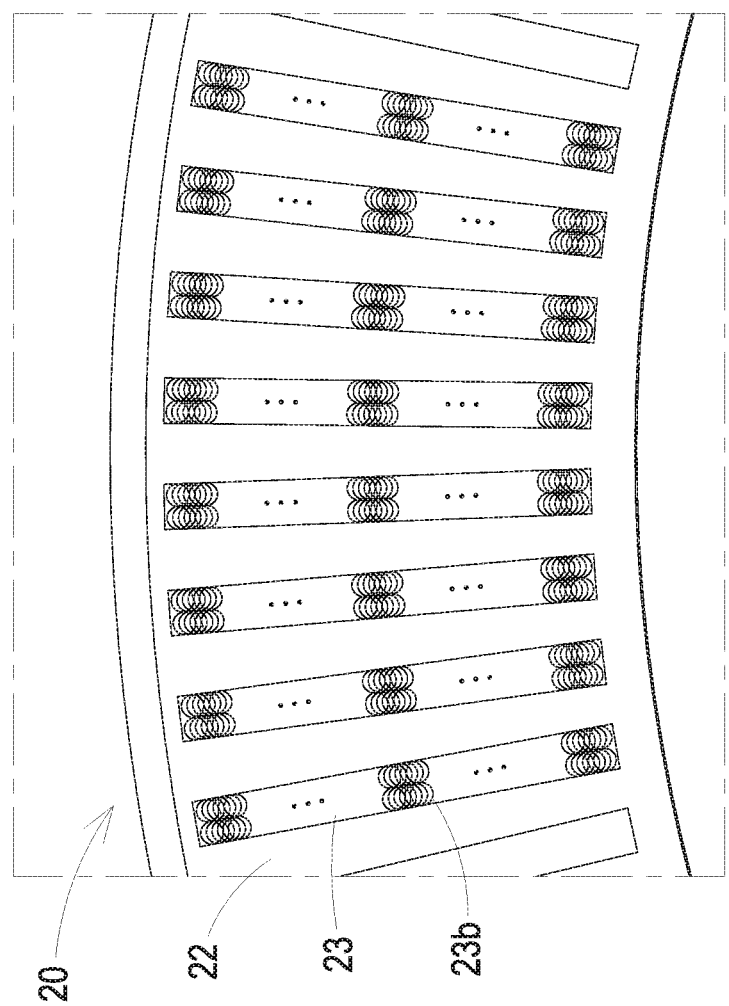
FIG. 7 is another exemplary structure illustrating the optical pattern of the optical reflective component according to the first preferred embodiment of the present disclosure.

It is noted that the optical pattern 23 of the optical reflective component 20 are formed for example by laser scribing and concavely formed on the reflective surface 22. For processing, a reference circle (for example an outer circle) of the main body 21 can be obtained by for example but not limited to the automated optical inspection (AOI), and the position of the second central axis C2 can be defined. Thus, the optical pattern 23 is scribed on the reflective surface 22 and coaxial with the second central axis C2 of the main body 21 by laser scribing based on the position of the second central axis C2. In addition, since the size of the laser spot on the laser scribing plane is fixed, the processing method of the even-width stripes is advantageous of making the surface characteristics of the laser scribing more consistent. FIG. 6 is an exemplary structure illustrating the optical pattern of the optical reflective component according to the first preferred embodiment of the present disclosure. In the embodiment, the optical pattern 23 includes the plurality of even-width stripes having the width similar to the diameter of the laser spot 23a. After laser scribing, a uniform optical pattern 23 is obtained. It is beneficial to prevent the laser spot from being overlapped unevenly in the local area during laser scribing. Moreover, it is advantageous of reducing the processing time of the laser scribing significantly. FIG. 7 is another exemplary structure illustrating the optical pattern of the optical reflective component according to the first preferred embodiment of the present disclosure. In the embodiment, the plurality of even-width stripes of the optical pattern 23 are wider. The laser scribing is performed in multiple parallel scribed-lines. Preferably but not exclusively, the width of the plurality of even-width stripes of the optical pattern 23 is twice the diameter of the laser spot 23b, and each of the even-width stripes can be completed in two parallel scribed lines to obtain the uniform optical pattern 23. Certainly, in other embodiments, the optical pattern 23 can also be composed of a plurality of uneven-width stripes. The present disclosure is not limited thereto and is not redundantly described herein.

Figure 8:
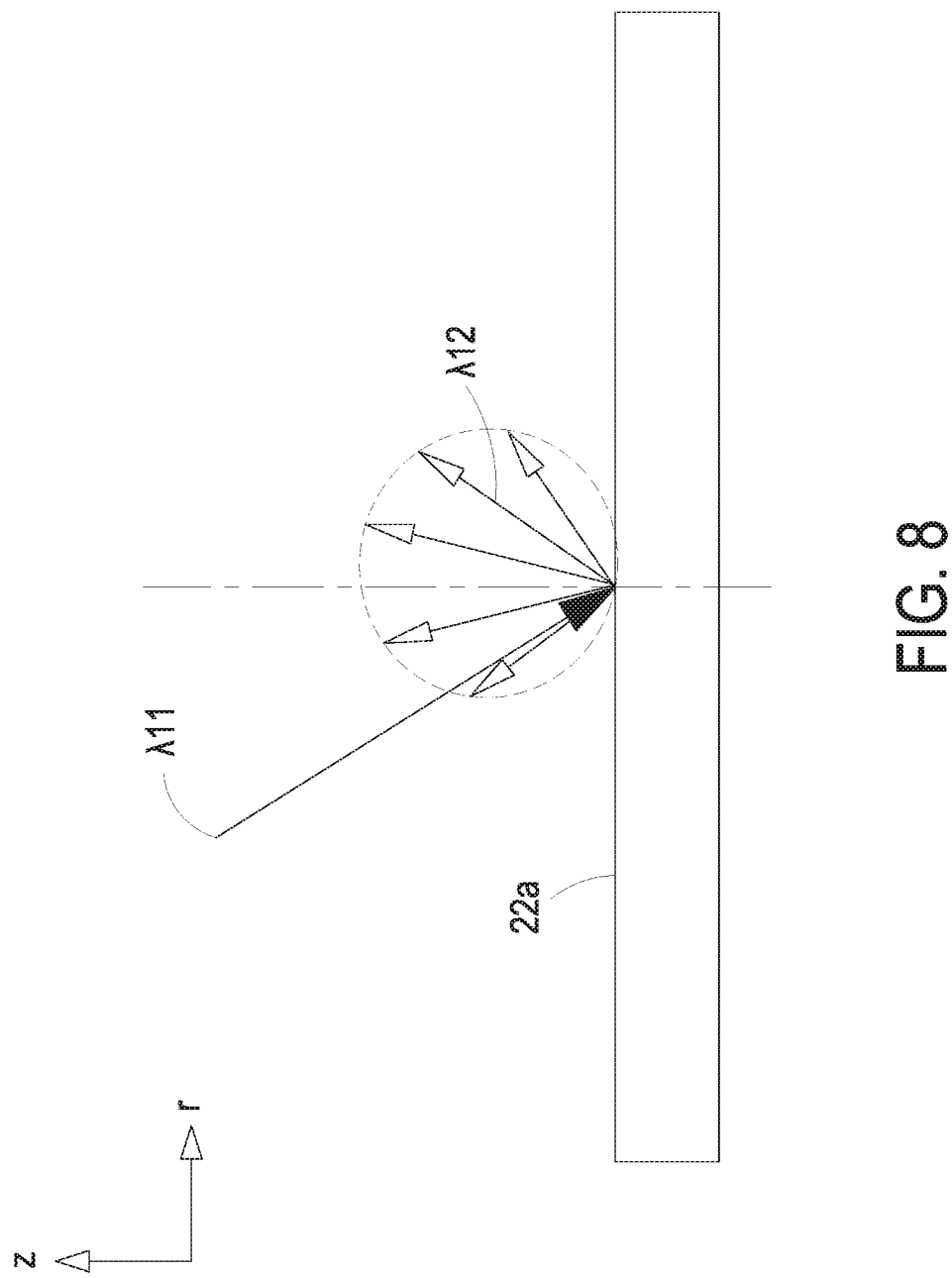
FIG. 8 is a first exemplary structure illustrating the optical characteristic of the reflective surface of the optical reflective component, which reflects the light of the radius-axial plane according to the first preferred embodiment of the present disclosure.

In the embodiment, the reflective surface 22 of the optical reflective component 20 is good at reflection compared to the optical pattern 23. Preferably but not exclusively, the reflective surface 22 is one selected from the group consisting of a mirrored surface, a polished surface and a milling-machined surface. FIG. 8 is a first exemplary structure illustrating the optical characteristic of the reflective surface of the optical reflective component, which reflects the light of the radius-axial plane according to the first preferred embodiment of the present disclosure. In the embodiment, the reflective surface 22a is for example a milling-machined surface, produced by a metal precision machining. In that, the reflective surface 22a formed by the milling-machining has a plurality of processing mark (not shown) which are concentric with the second central axis C2. When the incident light λ11 of the radius-axial plane is reflected through the reflective surface 22a, the reflected light λ12 is diffused and reflected (Diffuse reflection). The reflective characteristics of the reflective surface 22a reflecting the light of the radius (r)-axial (z) plane is sufficient to be distinguished from the optical pattern 23, so that the optical reading module 30 can read the optical pattern 23 from the reflective surface 22a accurately.

Figure 9:
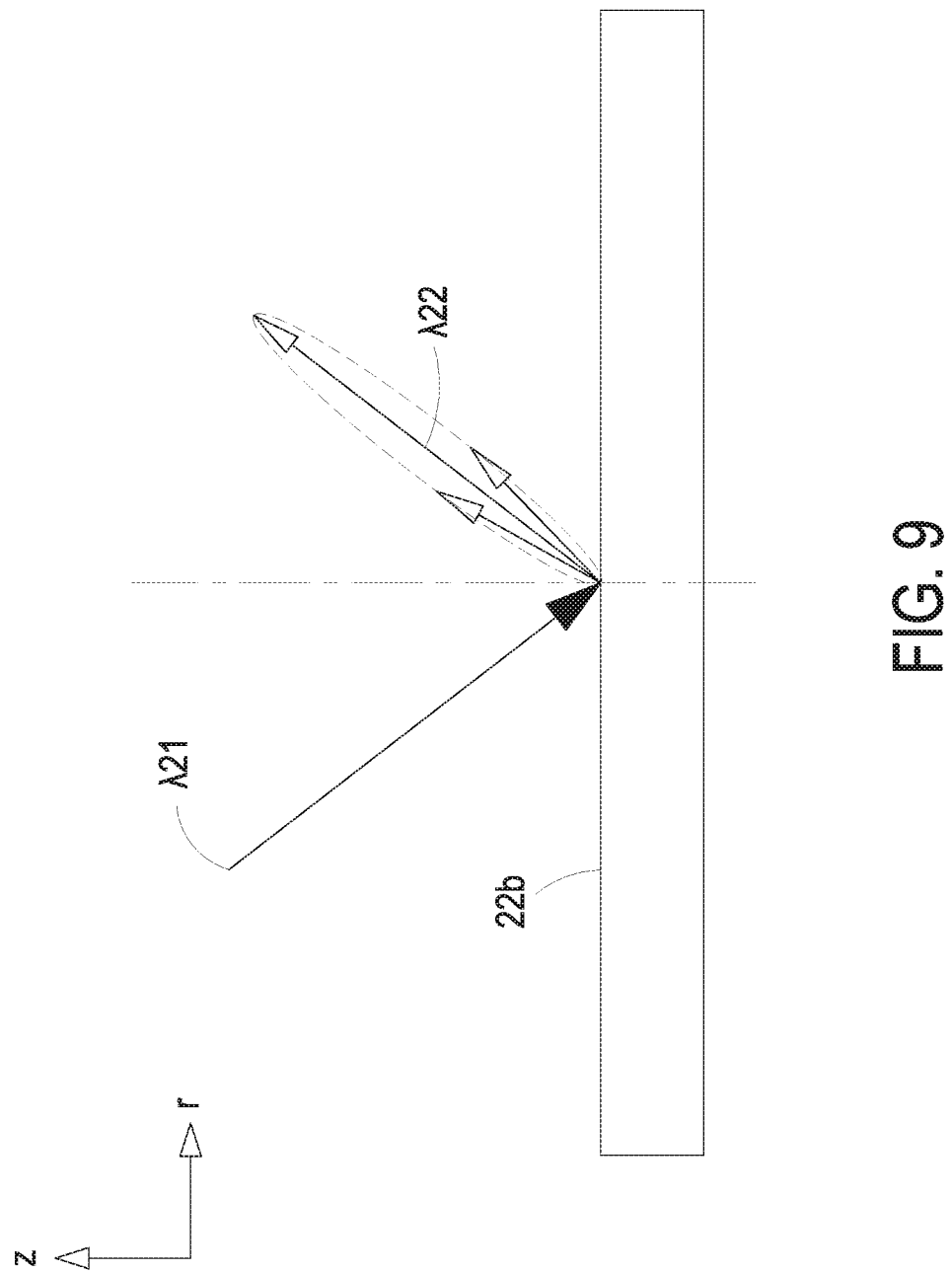
FIG. 9 is a second exemplary structure illustrating the optical characteristic of the reflective surface of the optical reflective component, which reflects the light of the radius-axial plane according to the first preferred embodiment of the present disclosure.

FIG. 9 is a second exemplary structure illustrating the optical characteristic of the reflective surface of the optical reflective component, which reflects the light of the radius-axial plane according to the first preferred embodiment of the present disclosure. In the embodiment, the reflective surface 22b is for example a polished surface, produced by grinding-polishing, electrolytic polishing or plating polishing. In that, the reflective surface 22b has the characteristic of the glossy reflection. When the incident light λ21 of the radius (r)-axial (z) plane is reflected through the reflective surface 22b, the reflected light λ22 is reflected in the glossy reflection. The reflective characteristics of the reflective surface 22b reflecting the light of the radius (r)-axial (z) plane is sufficient to be distinguished from the optical pattern 23, so that the optical reading module 30 can read the optical pattern 23 from the reflective surface 22b accurately.

Figure 10:
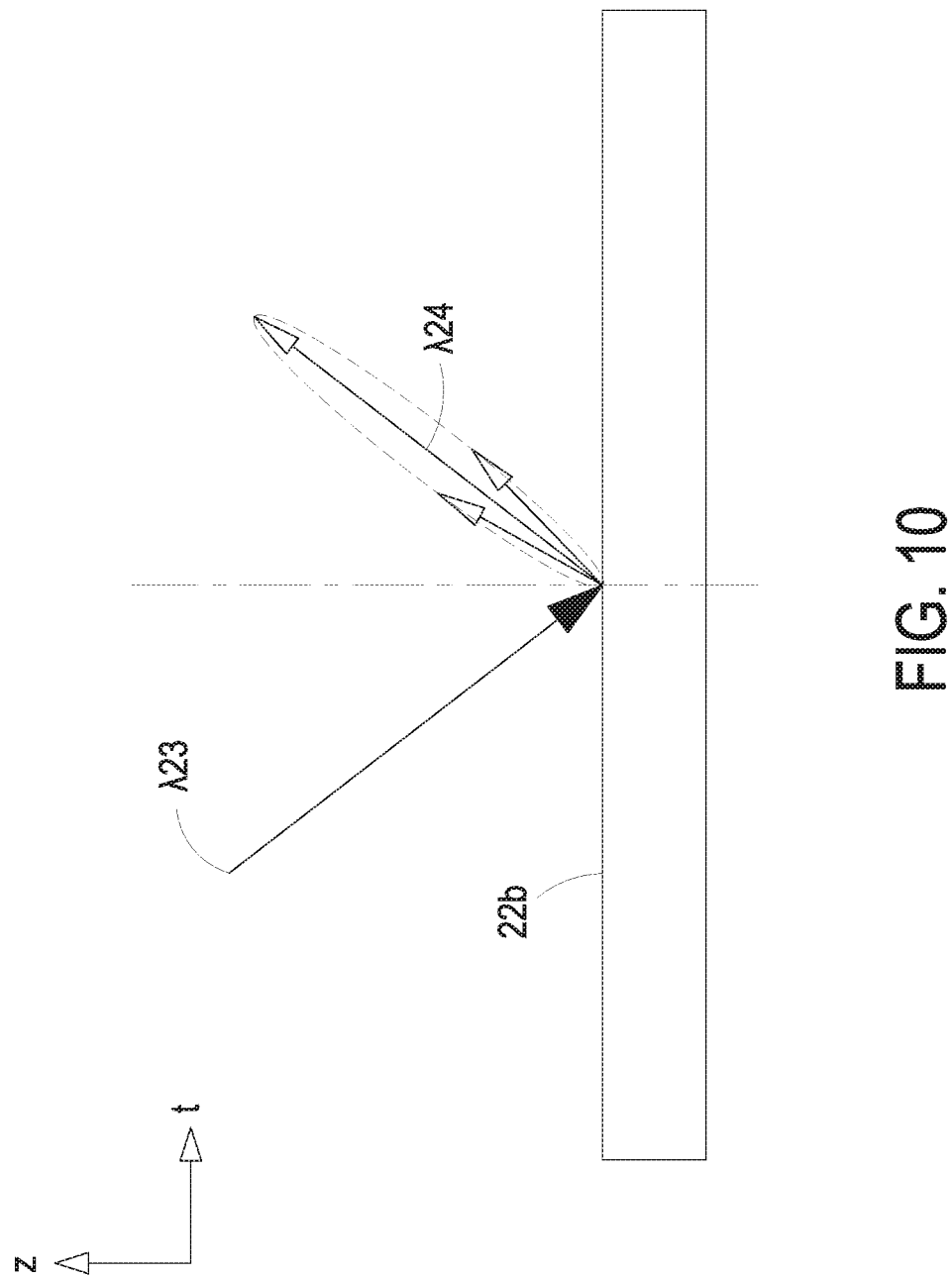
FIG. 10 is the second exemplary structure illustrating the optical characteristic of the reflective surface of the optical reflective component, which reflects the light of the tangential-axial plane according to the first preferred embodiment of the present disclosure.

FIG. 10 is the second exemplary structure illustrating the optical characteristic of the reflective surface of the optical reflective component, which reflects the light of the tangential-axial plane according to the first preferred embodiment of the present disclosure. In the embodiment, the reflective surface 22b is for example a polished surface, produced by grinding-polishing, electrolytic polishing or plating polishing. In that, the reflective surface 22b has the characteristic of the glossy reflection. When the incident light λ23 of the tangential (t)-axial (z) plane is reflected through the reflective surface 22b, the reflected light λ24 is reflected in the glossy reflection. The reflective characteristics of the reflective surface 22b reflecting the light of the tangential (t)-axial (z) plane is sufficient to be distinguished from the optical pattern 23, so that the optical reading module 30 can read the optical pattern 23 from the reflective surface 22b accurately.

Figure 11:
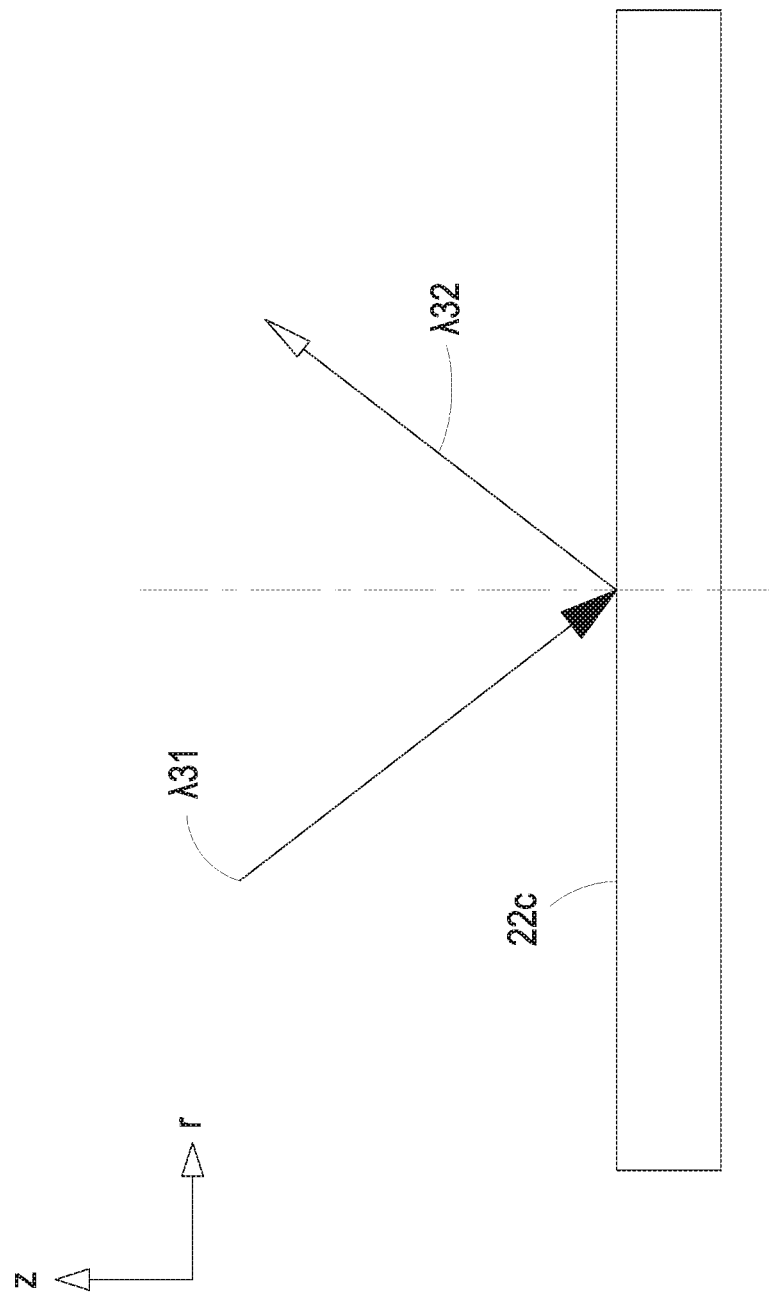
FIG. 11 is a third exemplary structure illustrating the optical characteristic of the reflective surface of the optical reflective component, which reflects the light of the radius-axial plane according to the first preferred embodiment of the present disclosure.

FIG. 11 is a third exemplary structure illustrating the optical characteristic of the reflective surface of the optical reflective component, which reflects the light of the radius-axial plane according to the first preferred embodiment of the present disclosure. In the embodiment, the reflective surface 22c is for example a mirrored surface and has the characteristic of the specular reflection. When the incident light λ31 of the radius (r)-axial (z) plane is reflected through the reflective surface 22c, the reflected light λ32 is reflected in the specular reflection. The reflective characteristics of the reflective surface 22c reflecting the light of the radius (r)-axial (z) plane is sufficient to be distinguished from the optical pattern 23, so that the optical reading module 30 can read the optical pattern 23 from the reflective surface 22c accurately.

Figure 12:
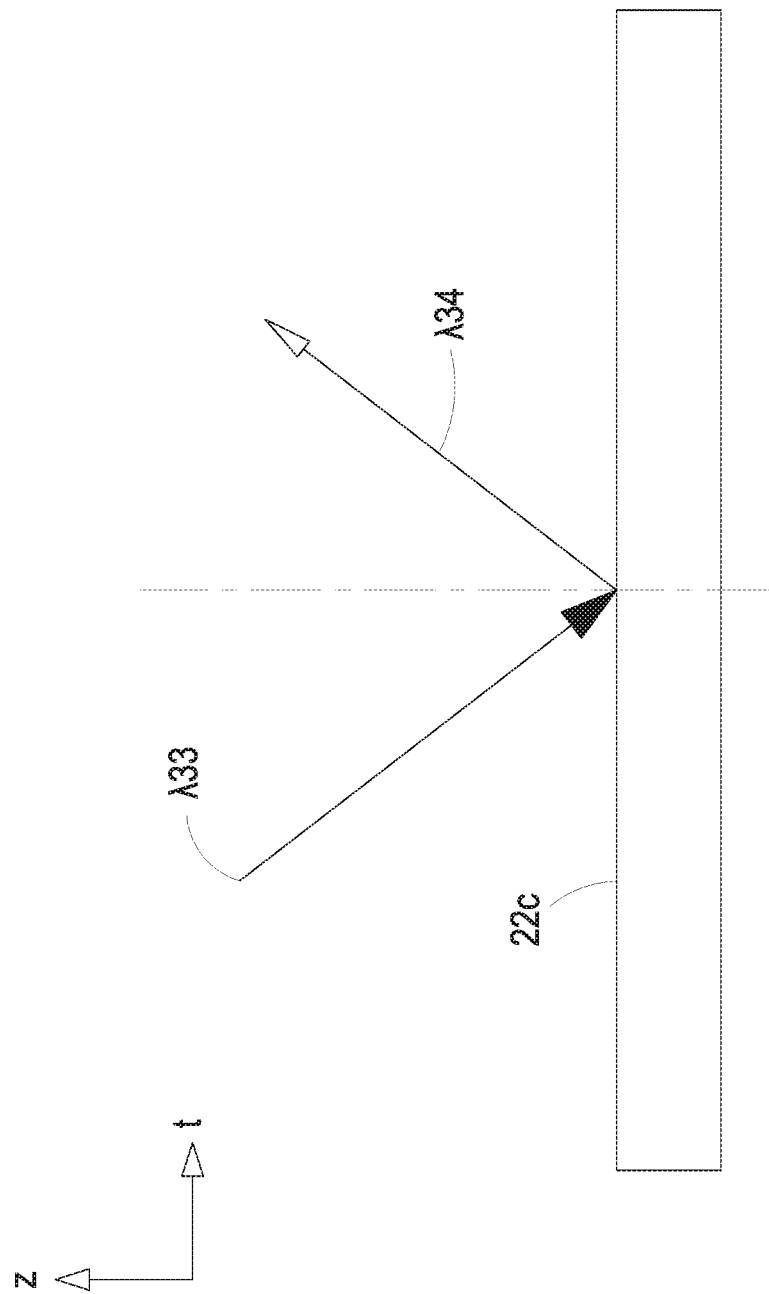
FIG. 12 is the third exemplary structure illustrating the optical characteristic of the reflective surface of the optical reflective component, which reflects the light of the tangential-axial plane according to the first preferred embodiment of the present disclosure.

FIG. 12 is the third exemplary structure illustrating the optical characteristic of the reflective surface of the optical reflective component, which reflects the light of the tangential-axial plane according to the first preferred embodiment of the present disclosure. In the embodiment, the reflective surface 22c is for example a mirrored surface and has the characteristic of the specular reflection. When the incident light λ33 of the tangential (t)-axial (z) plane is reflected through the reflective surface 22c, the reflected light λ34 is reflected in the glossy reflection. The reflective characteristics of the reflective surface 22c reflecting the light of the tangential (t)-axial (z) plane is sufficient to be distinguished from the optical pattern 23, so that the optical reading module 30 can read the optical pattern 23 from the reflective surface 22c accurately.

Notably, the present disclosure is not limited to the optical reflection characteristics of the reflective surface 22. Compared with the reflective surface 22, the optical pattern 23 formed for example by laser scribing has the optical characteristics of low reflectance, scattered reflection or diffuse reflection. In that, when the rotating shaft 10 drives the optical reflective component 20 to rotate, the optical reading module 30 can read the optical pattern 23 from the reflective surface 22 accurately.

Figure 13:
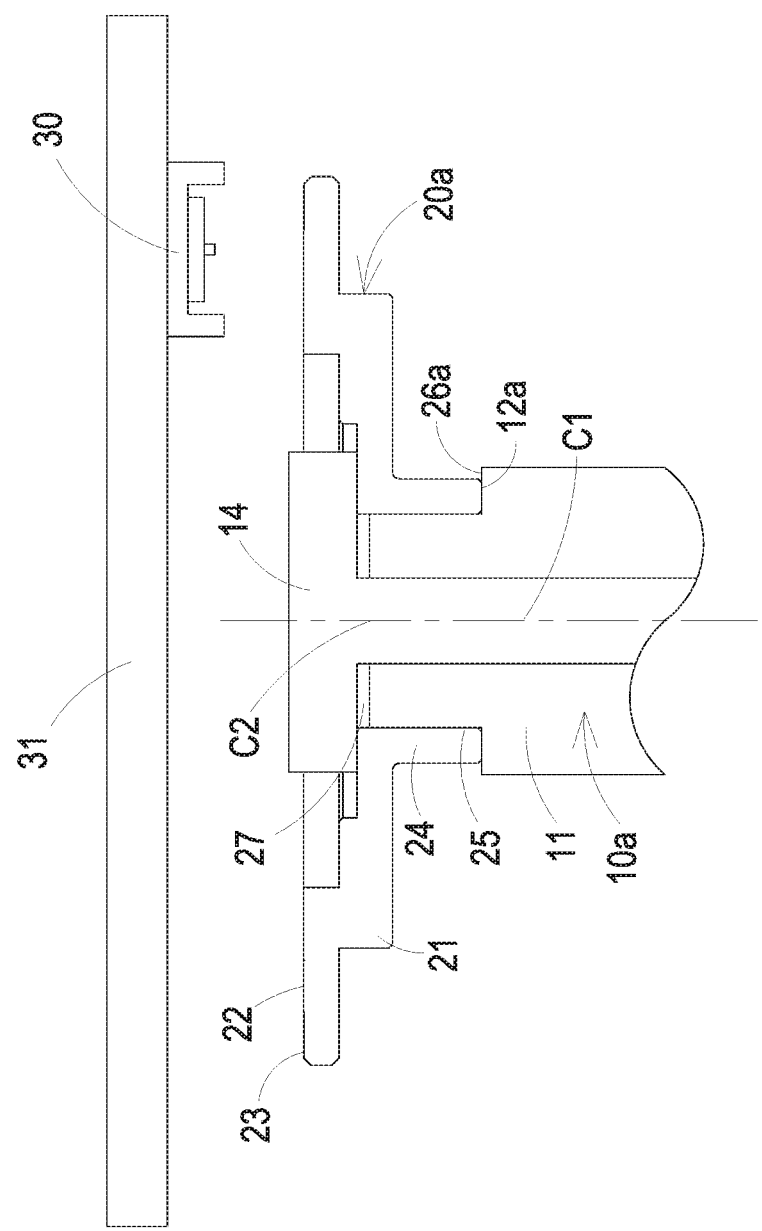
FIG. 13 is a cross-sectional view illustrating an optical encoder according to a second preferred embodiment of the present disclosure.

FIG. 13 is a cross-sectional view illustrating an optical encoder according to a second preferred embodiment of the present disclosure. In the embodiment, the structures, elements and functions of the optical encoder 1a are similar to those of the optical encoder 1 in FIG. 1, and are not redundantly described herein. Different from the optical encoder 1 in FIG. 1, in the embodiment, the second attaching portion 26a includes an annular plane, and connected to the bottom of the at least one curved surface 25 of the first attaching portion 24. Preferably but not exclusively, the datum plane 12a of the rotating shaft 10a is an annular plane, which is disposed on the intermediate section of the rotating shaft 10a and located relative to the annular plane of the second attaching portion 26a. In the embodiment, when the optical reflective component 20a is fastened on the rotating shaft 10a by the fastening element 14 located through the fastening hole 27, the optical reflective component 20a and the rotating shaft 10a are assembled together, and the positioning of the radius (r)-tangential (t) plane and the positioning of the axial (z) plane are achieved. Thus, when the rotating shaft 10a drives the optical reflective component 20a to rotate, the optical reading module 30 can read the optical pattern 23 accurately.

Figure 14:
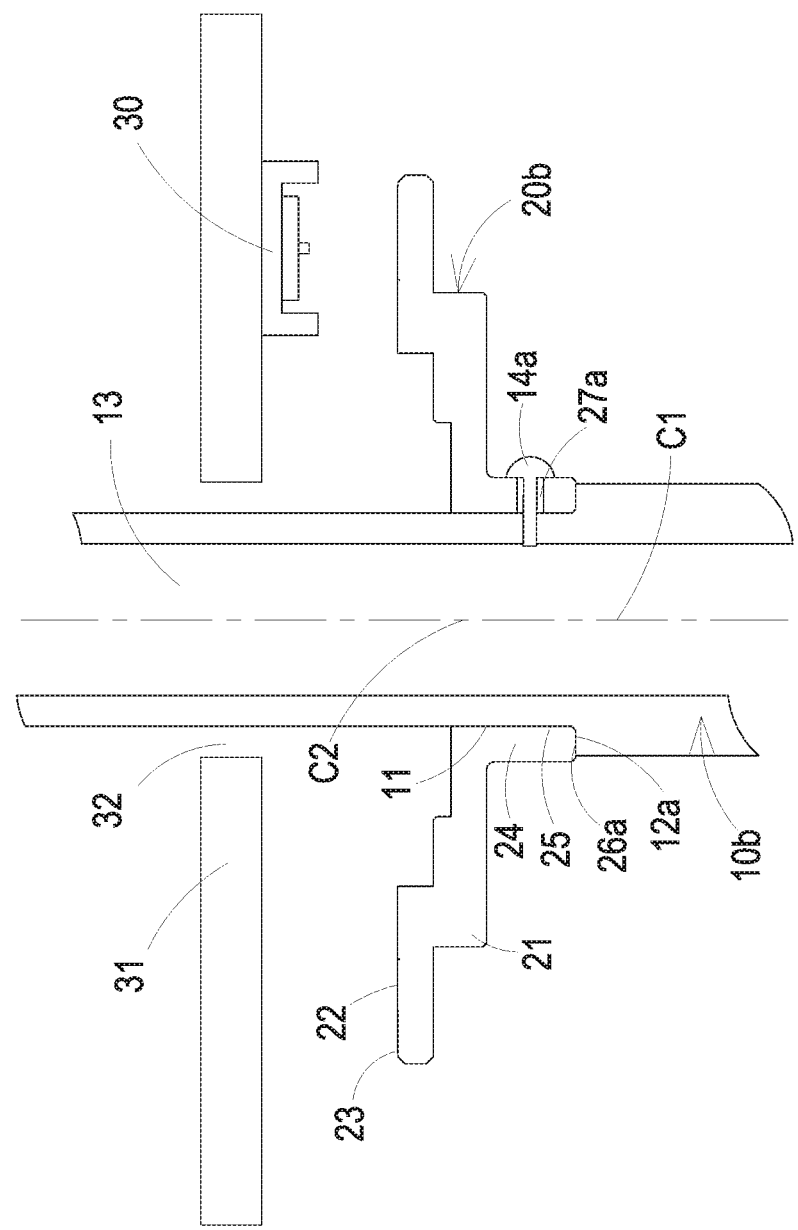
FIG. 14 is a cross-sectional view illustrating an optical encoder according to a third preferred embodiment of the present disclosure.
Figure 15:
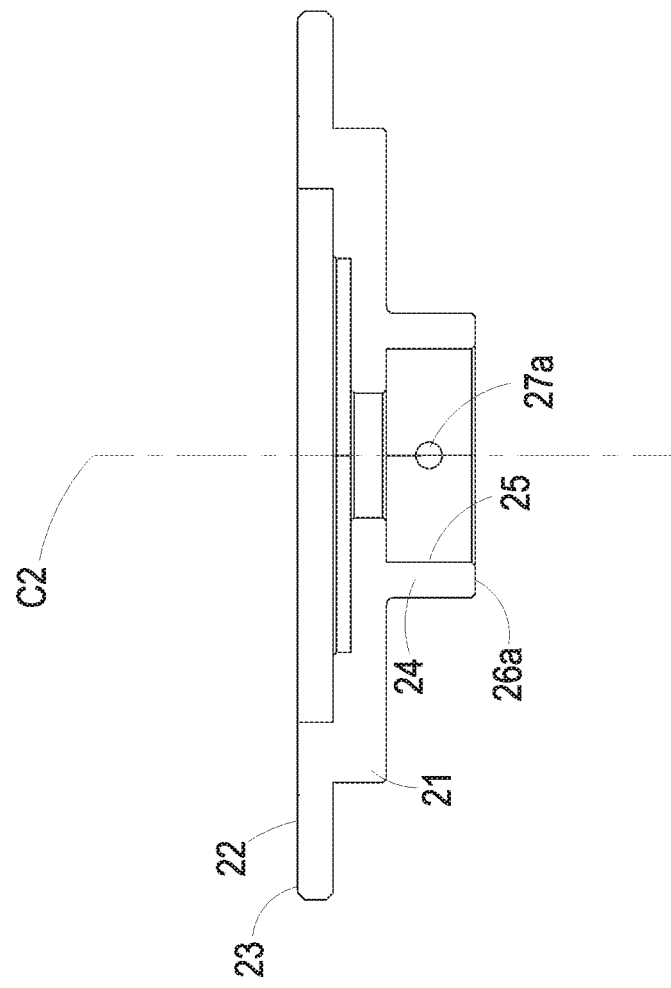
FIG. 15 is a cross-sectional view illustrating the optical reflective component according to the third preferred embodiment of the present disclosure.

FIG. 14 is a cross-sectional view illustrating an optical encoder according to a third preferred embodiment of the present disclosure. FIG. 15 is a cross-sectional view illustrating the optical reflective component according to the third preferred embodiment of the present disclosure. In the embodiment, the structures, elements and functions of the optical encoder 1b are similar to those of the optical encoder 1 in FIG. 1, and are not redundantly described herein. Different from the optical encoder 1 in FIG. 1, in the embodiment, the optical reflective component 20b includes a fastening hole 27a located through the first attaching portion 24 of the main body 21. The rotating shaft 10b includes a fastening element 14a. The optical reflective component 20b is fastened on the rotating shaft 10b by the fastening element 14a located through the fastening hole 27a. In the embodiment, the second attaching portion 26a includes an annular plane, and connected to the bottom of the at least one curved surface 25 of the first attaching portion 24. Preferably but not exclusively, the datum plane 12a of the rotating shaft 10b is an annular plane, which is disposed on the intermediate section of the rotating shaft 10b and located relative to the annular plane of the second attaching portion 26a. In the embodiment, when the optical reflective component 20b is fastened on the rotating shaft 10b by the fastening element 14a located through the fastening hole 27a, the optical reflective component 20b and the rotating shaft 10b are assembled together, and the positioning of the radius (r)-tangential (t) plane and the positioning of the axial (z) plane are achieved. Thus, when the rotating shaft 10b drives the optical reflective component 20b to rotate, the optical reading module 30 can read the optical pattern 23 accurately. Moreover, in the embodiment, the rotating shaft 10b further includes a hollow portion 13 disposed along the first central axis C1 thereof. The optical reading module 30 is disposed on a circuit board 31. The circuit board 31 further includes an opening 32. The rotating shaft 10b passes through the opening 32. Thus, the hollow portion 13 of the rotating shaft 10b is provided for a leading wire passing therethrough. Certainly, the present disclosure is not limited thereto and not redundantly described herein.

Figure 16:
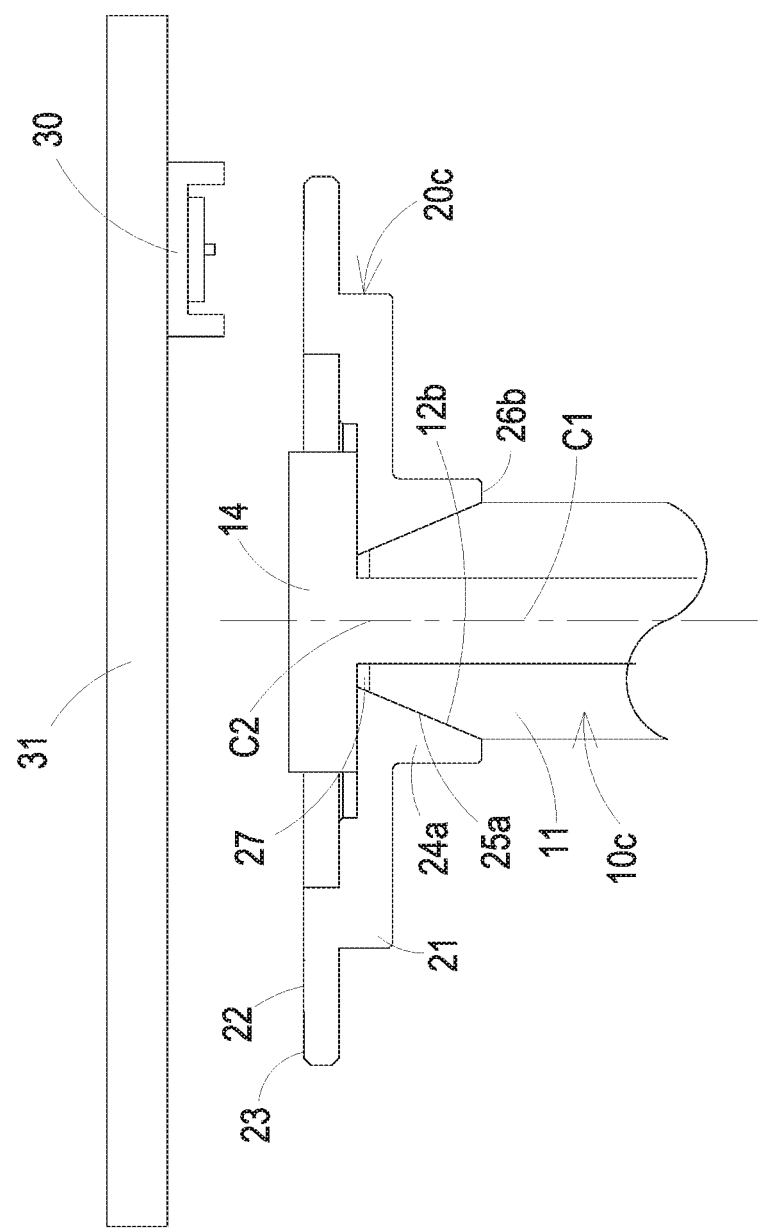
FIG. 16 is a cross-sectional view illustrating the optical reflective component according to the fourth preferred embodiment of the present disclosure.

FIG. 16 is a cross-sectional view illustrating an optical encoder according to a fourth preferred embodiment of the present disclosure. In the embodiment, the structures, elements and functions of the optical encoder 1c are similar to those of the optical encoder 1 in FIG. 1, and are not redundantly described herein. Different from the optical encoder 1 in FIG. 1, in the embodiment, the inner wall of the first attaching portion 24a is a conical surface. The conical surface 25a is unequal spacing from the second central axis C2 to the inner wall of the first attaching portion 24a. Moreover, the distance between conical surface 25a of the inner wall of the first attaching portion 24a and the second central axis C2 is gradually increased from the inside to the outside, so that the central hollow of the inner wall of the first attaching portion 24a is expanded outwardly. In the embodiment, with the design of the conical surface 25a of the inner wall of the first attaching portion 24a, the datum plane 12b of the rotating shaft 10 is directly attached the conical surface 25a, instead of abutting the second attaching portion 26a. In this way, the concentric positioning and the axial positioning of the optical reflective component 20c and the rotating shaft 10c of the matched motor or drive module are achieved at the same time and more precise. In the embodiment, when the optical reflective component 20c is fastened on the rotating shaft 10c by the fastening element 14 located through the fastening hole 27, the optical reflective component 20c and the rotating shaft 10c are assembled together, and the positioning of the radius (r)-tangential (t) plane and the positioning of the axial (z) plane are achieved. Thus, when the rotating shaft 10c drives the optical reflective component 20c to rotate, the optical reading module 30 can read the optical pattern 23 accurately.

In summary, the present disclosure provides an optical reflective component and an optical encoder using the same. The locking and fastening method of the optical reflective component and the rotating shaft of the optical encoder can be adjusted according to the practical requirements. The rotating shaft further includes a hollow portion for a leading wire passing therethrough. The positioning of the radius (r)-tangential (t) plane and the positioning of the axial (z) plane are achieved by assembling the optical reflective component with the rotating shaft of the optical encoder. It facilitates the first central axis of the reflective component and the second central axis of the rotating shaft to be coaxial. Thus, the optical reading module can read the optical pattern perpendicular to the first central axis accurately. In addition, the optical reflective component is made of a metal material and integrally formed in one piece. The optical pattern on the optical reflective component is formed, for example, by laser-scribing. With the optical reflective component integrally formed, for example, an automated optical inspection (AOI) can be used to obtain the reference circle portion of the optical reflective component and define the position of the first central axis. Thus, the optical pattern can be scribed on the optical reflective component and coaxial with the first central axis of the optical reflective component accurately. On the other hand, the optical pattern of the optical reflective component includes a plurality of even-width stripes, which are disposed on the reflective surface perpendicular to the first central axis and concavely formed by, for example, laser scribing. The plurality of even-width stripes are arranged in a circumferential direction to form a concentric annular distribution, which is circularly symmetrical. The reflective surface can be a mirrored surface, a polished surface or a milling-machined surface. The optical pattern scribed by the laser is characterized by optical low reflectivity, scattered reflection or diffuse reflection. In addition, the even-width stripe formed by laser-scribing is beneficial of maintaining the consistency of the optical pattern and reducing the processing time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical reflective component comprising:
a main body comprising a first central axis and a reflective surface, wherein the first central axis and the reflective surface are perpendicular to each other;
an optical pattern disposed on the reflective surface, wherein the optical pattern is arranged around and centered at the first central axis;
a first attaching portion centered at the first central axis of the main body and extending from the main body in a direction parallel to the first central axis, wherein the first attaching portion comprises an inner wall; and
a second attaching portion comprising a plane, wherein the plane is perpendicular to the first central axis of the main body and connected to the inner wall of the first attaching portion, wherein the main body, the first attaching portion and the second attaching portion are made of a metal material and integrally formed with the optical pattern.

2. The optical reflective component according to claim 1, wherein the first attaching portion is configured to connect with an outer edge of a rotating shaft, wherein the first central axis of the main body is aligned to a second central axis of the rotating shaft, and the second attaching portion is configured to match and align to a datum plane of the rotating shaft.

3. The optical reflective component according to claim 2, further comprising a fastening hole located through the main body and aligned with the first central axis of the main body, wherein the rotating shaft comprises a fastening element and the optical reflective component is fastened on the rotating shaft by the fastening element located through the fastening hole.

4. The optical reflective component according to claim 2, further comprising a fastening hole located through the first attaching portion, wherein the rotating shaft comprises a fastening element and the optical reflective component is fastened on the rotating shaft by the fastening element located through the fastening hole.

5. The optical reflective component according to claim 1, wherein the optical pattern comprises a plurality of even-width stripes and the plurality of even-width stripes are directed to the first central axis of the main body.

6. The optical reflective component according to claim 5, wherein the plurality of even-width stripes are concavely formed on the reflective surface of the main body by laser scribing.

7. The optical reflective component according to claim 1, wherein the optical pattern is centered at the first central axis of the main body and circularly symmetrical.

8. The optical reflective component according to claim 1, wherein the reflective surface is one selected from the group consisting of a mirrored surface, a polished surface and a milling-machined surface.

9. The optical reflective component according to claim 1, wherein the inner wall comprises a curved surface, a ring surface or a conical surface.

10. An optical encoder comprising:
a rotating shaft comprising a second central axis, an outer edge and a datum plane, wherein the datum plane is perpendicular to the second central axis;
an optical reflective component connected to the rotating shaft and comprising:
a main body comprising a first central axis and a reflective surface, wherein the first central axis and the reflective surface are perpendicular to each other;
an optical pattern disposed on the reflective surface, wherein the optical pattern is arranged around and centered at the first central axis of the main body;
a first attaching portion centered at the first central axis of the main body and extending from the main body in a direction parallel to the first central axis of the main body, wherein the first attaching portion comprises an inner wall configured to connect with the outer edge of the rotating shaft, so that the first central axis of the main body is aligned to the second central axis of the rotating shaft; and
a second attaching portion comprising a plane, wherein the plane is perpendicular to the first central axis of the main body and connected to the inner wall of the first attaching portion, wherein the second attaching portion is configured to match and align to the datum plane of the rotating shaft, wherein the main body, the first attaching portion and the second attaching portion are made of a metal material and integrally formed with the optical pattern; and
an optical reading module spatially disposed and facing to the optical pattern on the reflective surface, wherein when the rotating shaft drives the optical reflective component to rotate, the optical pattern is read by the optical reading module.

11. The optical encoder according to claim 10, wherein the optical pattern comprises a plurality of even-width stripes and the plurality of even-width stripes are directed to the first central axis of the main body.

12. The optical encoder according to claim 11, wherein the plurality of even-width stripes are concavely formed on the reflective surface of the main body by laser scribing.

13. The optical encoder according to claim 10, wherein the optical pattern is centered at the first central axis of the main body and circularly symmetrical.

14. The optical encoder according to claim 10, wherein the optical reflective component further comprises a fastening hole located through the main body and aligned with the first central axis of the main body, wherein the rotating shaft comprises a fastening element and the optical reflective component is fastened on the rotating shaft by the fastening element located through the fastening hole.

15. The optical encoder according to claim 10, wherein the optical reflective component further comprises a fastening hole located through the first attaching portion, wherein the rotating shaft comprises a fastening element and the optical reflective component is fastened on the rotating shaft by the fastening element located through the fastening hole.

16. The optical encoder according to claim 10, wherein the reflective surface is one selected from the group consisting of a mirrored surface, a polished surface and a milling-machined surface.

17. The optical encoder according to claim 10, wherein the rotating shaft comprises a hollow portion disposed along the second central axis of the rotating shaft.

18. The optical encoder according to claim 10, wherein the optical reading module is mounted on a circuit board, and the circuit board comprises an opening, wherein the rotating shaft passes through the opening.

19. The optical encoder according to claim 10, wherein the inner wall comprises a curved surface, a ring surface or a conical surface.

20. The optical encoder according to claim 10, wherein the second attaching portion is configured to match and align to a datum plane of the rotating shaft.

* * * * *